July 10, 1956            J. BAILEY            2,753,596
METHOD AND APPARATUS FOR MAKING PLASTIC TUBING
Filed June 7, 1952            2 Sheets-Sheet 1
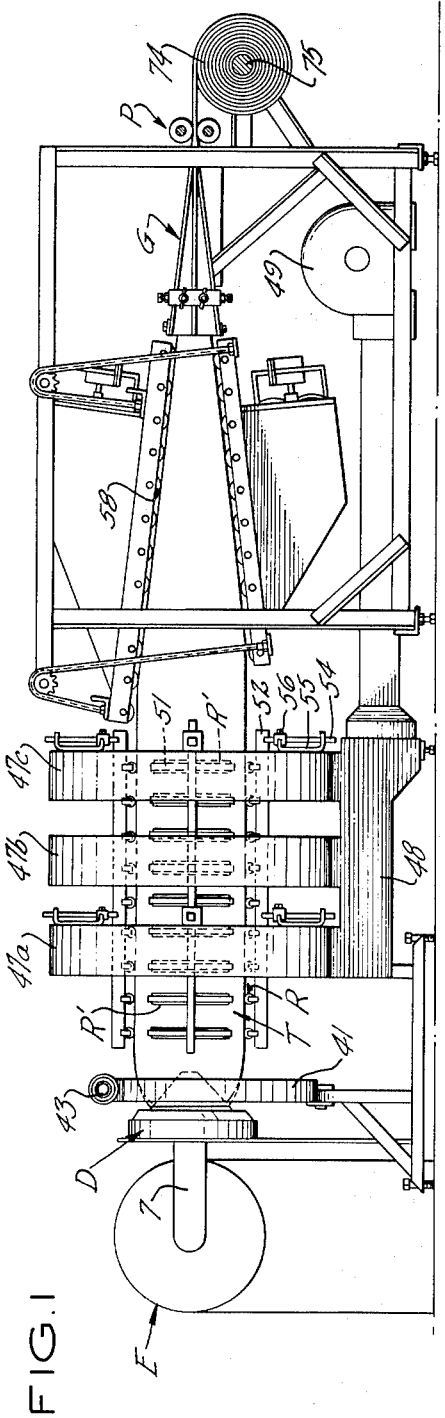
INVENTOR
JAMES BAILEY
BY Bates + Willard
ATTORNEYS

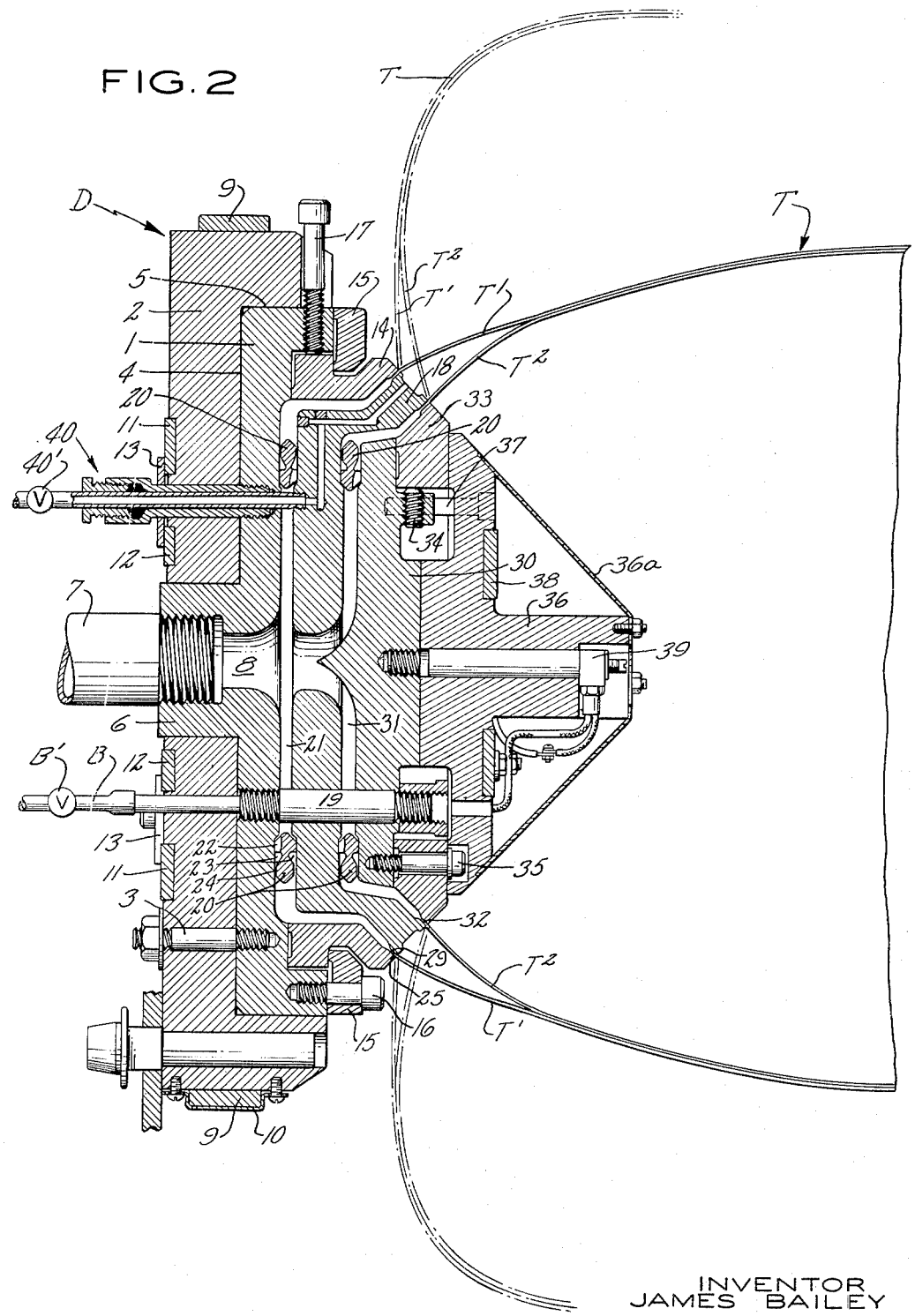

United States Patent Office 2,753,596
Patented July 10, 1956

2,753,596

METHOD AND APPARATUS FOR MAKING PLASTIC TUBING

James Bailey, West Hartford, Conn., assignor to Plax Corporation, West Hartford, Conn., a corporation of Delaware Application June 7, 1952, Serial No. 292,290

17 Claims. (Cl. 18—13)

The present invention relates to the extrusion of films of thermoplastic materials. Polyethylene is an example of one such material which, under suitable temperature and pressure conditions, may be extruded in the form of tubular or flat film, preferably without an excess of solvent or plasticizer and without a drying or curing step, such as is necessary when an excess of solvent is employed to render the material plastic.

There is a large demand in the packaging and other fields for these plastic films. However, considerable difficulty has been experienced in extruding them without occasional pin holes and other imperfections.

In making thinner films, the likelihood of getting pin holes becomes greater as well as the difficulty of detecting them. Pin holes usually occur as the result of a lump or less mobile portion of the plastic material which slows down while passing through the extrusion die and does not stretch later with the same ease as the main body of plastic. They may occur in streaks for a while or shift to other locations in a short time. In this respect, they are quite randomly distributed. As a function of total area of the sheet, the pin holes are very small and their frequency of occurrence likewise is low. However, where absolute freedom from pin holes is required, their occurrence on the rarest occasion must be avoided.

It is an object of the present invention to provide process and apparatus for producing pin hole free film.

A further object is the provision of process and apparatus for producing seamless tubular film, which is pinhole free, in a continuous one-heat extrusion operation.

More particularly, it is an object to extrude, size and laminate generally concentric tubes in a continuous operation.

Other objects and advantages will be apparent to those skilled in the art from the following description of an illustrative embodiment of the invention shown in the accompanying drawings, in which:

Figure 1 is a side elevation of apparatus for producing collapsed thin-wall tubular film in accordance with the invention;

Fig. 2 is an enlarged vertical cross-sectional view of the multiple tubing extrusion dies shown in Fig. 1;

Fig. 3 is an enlarged front view of the cooling ring shown in side elevation in Fig. 1;

Fig. 4 is a cross-sectional view taken on line 4—4 of Fig. 3; and

Figs. 5–7, inclusive, are enlarged views of portions of the like breaker rings in the die shown in Fig. 2.

Referring to Figs. 1 and 2 of the drawings, the illustrated embodiment of the invention includes a tubing die D from which a pair of thin-wall tubes $T^1$ and $T^2$ may be continuously extruded. A suitable extruder E preferably includes heating, homogenizing and pressure producing components, for forcing a plastic material, such as polyethylene, through the die D under proper extrusion conditions of temperature, pressure and homogeneity to effect a die shaping of the material in the form of the tubes $T^1$ and $T^2$.

Referring more particularly to Fig. 2, the illustrated die D includes a generally annular outer die holder 1 to which a concentric outer die heater 2 is secured by suitable studs or other fastening means which may be located in a circle at spaced points about the die and one of which is shown at 3. The heater 2 makes intimate contact with the outer radial and peripheral surfaces 4 and 5, respectively, of the die holder 1 and with the peripheral surface of an annular inlet shoulder portion 6 of the holder 1 through which plastic from discharge outlet 7 of the extruder E is fed into inlet 8 of the die. The intimate surface contact of the die holder 1 and heater 2 assures excellent heat transfer between the two members. An electric strip heater 9, which is secured by clips such as shown at 10 to the outer periphery of the heater 2, and ring heaters 11 and 12, which are secured by clamps 13 to the outer face of the heater 2, supply the heat required to maintain plastic passing through the die at a desired temperature of plasticity.

An outer annular die lip member 14 is adjustably secured to the die holder 1 by a retaining ring 15 which is fastened to the holder 1 by suitable bolts, one of which is shown at 16. Radial adjustment of the die lip 14 may be effected by cap screws 17. While only one such screw 17 is shown, it will be understood that a plurality are disposed at spaced intervals about the circular holder 1 and their inner ends bear on and center the die lip 14 in any desired position of radial adjustment prior to tightening the bolts 16.

An intermediate die lip member 18 is located within the outer die member 14 and the die holder 1 on suitable sleeves 19, the outer ends of which may be fastened by thread connections to the die holder 1. While only one such sleeve 19 is shown in the drawings, it again will be understood that a plurality of them may be provided to assure fixed location of the die member 18 relative to the holder 1. The die member 18 is spaced from the holder by distributor ring 20 so as to provide a passage 21 therebetween through which plastic flows and discharges, as the tubing T–1.

Details of the preferred distribution ring 20 are illustrated in Figs. 5, 6 and 7 from which it will be seen that plastic from the die inlet 8 flowing through the passage 21 (Fig. 2) flows through spaced radially extending passageways 22 into annular spaces 23 and thence through annular constricted passages 24 and the downstream portion of the passage 21 to an annular die outlet 25. As shown in Figs. 5–7, the spaced radially extending passageways 22 are separated by gear tooth-shaped projections 26 on opposite sides of the ring 20 which projections tightly engage the die holder 1 and intermediate die member 18, thereby spacing annular grooves 27 and flat lands 28 on opposite sides of the ring 20 from the adjacent faces of the die holder 1 and die member 18 so as to form the annular chamber 23 and constricting annular passages 24. Preferably the teeth 26 on opposite sides of the ring 20 are alternated so that a tooth on one side is opposite a passage 22 on the opposite side, as shown in Fig. 6. As shown in Fig. 2, the passageway 21 becomes increasingly restricted downstream of the distribution ring 20 with the greatest restrictions provided between the flat lands 29 at the annular die outlet 25.

The sleeves 19 center an inner die holder 30 relative to the intermediate die member 18 and the die holder 1, the inner die holder 30 being spaced from the die member 18 by a second distributor ring 20 and thereby providing a second passageway 31, substantially like the passageway 21, from which the plastic tubing T–2 is discharged from the annular die outlet orifice 32. An inner annular die member 33 is adjustably supported by adjustment screws 34 relative to the inner die holder 30 and secured in its adjusted position to the inner die holder by bolts 35. An inner die heater 36 is secured in intimate contact to the inner faces of the die holder 30 and the inner die 33, as by bolts 37. The member 36 is provided with suitable heating means, such as ring heater 38, and is provided with a blockhead thermostat 39 for automatically regulating temperature of the inner portion of the die and thereby of the plastic passing through the passageway 31 in contact therewith. Suitable electric wiring connections for the ring heater 38 and the thermostat 39 pass outwardly through one or more of the sleeves 19 to a source of electric current and suitable controls therefor. As shown in Fig. 2, the inner end of the die is provided with a conical casing 36a which houses the inner end of the heater 36.

Blowing air may be introduced into the interior of the tubing $T^2$, as through one of the sleeves 19, from a pressure line B controlled by valve B'. It will be seen in Fig. 2, that the intermediate die member 18 on the outer die holder and heater 1 and 2, respectively, are suitably drilled to provide a passageway and sleeve connections, generally designated 40, and valve 40' for controlling the introduction or withdrawal of fluid pressure medium between the tubing $T^1$ and $T^2$.

Preferably the outer faces of the die members 14, 18 and 33 are conical, as shown in Fig. 2, and die outlets 25 and 32 are parallel and at right angles to the conical surface. However, the die outlets may be from a flat rather than a conical surface, or from the periphery of a cylindrical surface as desired.

Fine adjustment of the die outlets 25 and 32 is effected by the adjustment screws 17 and 34, respectively. As shown in Fig. 2, the dieing surfaces or lands of the outlets 25 and 32 are disposed at approximately 45° to the adjustment screws 17 and 34 so that movement of the lands of an outlet relative to each other is only 0.7 of the longitudinal movement of the adjustment screw for the outlet. Angular disposition of the adjustment screw relative to the lands of the die outlet is particularly desirable where fine adjustment of a die outlet is required.

As is described at greater length hereinafter, the tubing $T^1$ and $T^2$ unite to form a single tube T at a point adjacent the die outlets and thereafter as shown in Fig. 1 passes through an annular cooling ring 41, the construction of which is best shown in Figs. 3 and 4. Generally the cooling ring is an annular chamber to which cooling air from any suitable source is supplied through inlet 43 and from which the cooling air is discharged against the tube T through an annular orifice 44, the size of which may be adjusted at spaced points above the inner circumference by means of push and pull adjustment screws 45 and 46, respectively. The cooling air discharged from the orifice 44 reduces the temperature and consequently the plasticity of the tubing T passing therethrough. Adjustment in the width of the orifice 44 regulates the quantity of cooling air discharged against the underlying portion of the tube and thereby provides for controlling the expansion of the tubing about its periphery. Thus, for example, when tubing is blowing up unevenly and a thin streak develops, widening of the portion of the discharge orifice 44 overlying the thin streak provides additional cooling and chilling. The additional chilling reduces expansion and thinning of the underlying portion and greater uniformity of thickness is obtained. Conversely, the orifice 44 may be made smaller at selected points where the underlying tubing may not be expanded sufficiently.

The tubing T next passes through a series of three annular wind boxes 47a, 47b, 47c which direct additional cooling air against the tubing. The several wind boxes 47a, 47b, 47c may be supplied with air under pressure of a few inches of water from a common manifold 48 and blower 49. The air thus supplied to the wind boxes may be discharged into contact with the tubing T through a series of openings (not shown) which may be located at spaced intervals in the inner peripheral wall of each wind box and individually regulated in size by sliding dampers as disclosed in U. S. Patent No. 2,559,386, issued July 3, 1951, to Bailey.

A series of freely rotatable horizontal rolls R and vertical rolls R' are provided to support and control the size of the tubing. The rolls R and R' are arranged transversely of and tangentially to the periphery of the tubing in spaced circles which are coaxially disposed relative to the wind boxes 47a, 47b, 47c and, as so disposed, limit the diameter to which the tubing is blown, substantially as shown in Fig. 1.

The rollers R and R' are rotatably mounted at their ends in individual U-shaped bearing brackets or yokes 51 which are secured at their centers to four mounting strips 52. Each of the mounting strips 52 is adjustably secured at spaced points to the inner ends of its own pair of supporting rods 54 which extend radially from the tubing T. The rods 54 are slidably supported in individual bearing brackets 55 which, as shown in the drawings, are secured to the wind boxes 47a and 47c. As thus supported, the rods 54 may be moved radially inward or outward to enlarge or decrease the shape of the passageway defined by each of the several rings of rollers R, R'. Each of the rods 54 is provided with an adjustable fastener 56 (Fig. 1) for locking the rod in a desired position of adjustment.

Provision also may be made for longitudinally adjusting each of the mounting strips 52 relative to its supporting rods 54 so that the rollers R may be spaced or staggered relative to the rollers R' so that their ends may be overlapping when small diameter tubing T is to be sized.

After passing through the wind boxes 47a, 47b, 47c and the frictionless restraining passageway defined by the rolls R and R', the tubing T is partially collapsed by a roller assembly, which includes a series of metal rollers 58 located transversely of the tubing along two converging lines above and below the tubing, substantially as shown and described in the U. S. patent application, Serial No. 2,936 of Bailey and Reber, filed January 17, 1943, now Patent No. 2,529,897.

From the rolls 58, the tubing T may, if desired, be drawn by a pair of driven pulling rolls P through a gusseting mechanism, generally designated G, which acts to further collapse the tubing and, at the same time, in cooperation with the internal fluid pressure introduced and maintained through the pressure line B, forms tucks, plaits or gussets in the side of the collapsing tube. For further details of the gusseting mechanism G, reference may be made to U. S. application, Serial No. 38,606, of Reber and Dalzell, filed July 14, 1948, now Patent No. 2,544,044. From the pulling rolls P, fully collapsed tube is fed to and wound in a roll 74 upon a driven arbor 75 of a conventional winding mechanism (not shown).

During the operation of the illustrative apparatus heretofore described with reference to the drawings, the plastic tubes $T^1$ and $T^2$ when extruded from the concentric die orifices 25 and 32 (Fig. 2) preferably are in a plastic condition which causes them to bond together to form the single tube T. The blowing air introduced through pressure line B presses the inner tube $T^2$, which it first expands, into firm bonding contact with the outer tube $T^1$ and expends the composite tube T thus formed.

In actual practice, it has been found that once an amount of pressure medium, such as air sufficient to expand the tube T to a desired size, has been introduced through the line B, the valve B' may be closed and uniform tubing continually formed with the air thus captured between the valve B' and the pulling rolls P. Only infrequent adjustment of the valve B' is required as the internal air pressure of the captured air does not vary appreciably over extended periods. However, it should be understood that, if desired, the air pressure supplied through line B may be continuously regulated in suitable manner, as for example, as disclosed in U. S. Patent No. 2,529,897 to Bailey et al.

In starting the multi-tube forming operation of the present invention, it has been found that bubbles of air may be captured in the composite tube T until the air between the tubes $T^1$ and $T^2$ becomes, through continued operation, reduced in volume and pressure. Preferably, therefore, a subatmospheric pressure is exerted in line 40 by suitable suction means (not shown) at the start of production. Thereafter, the valve 40' is closed to capture the subatmospheric pressure thereby avoiding bubbles in the tubing T and at the same time increasing the effective pressure acting to bond the tubes $T^1$ and $T^2$ to form the tube T.

Alternatively, the invention contemplates introducing superatmospheric pressure through line 40 to keep the tubes $T^1$ and $T^2$ separate for a greater distance from the die outlets 25 and 32 so that they can be cooled before contacting sufficiently to avoid bonding and thereby produce multiply separable tubes in intimate but unbonded engagement with each other.

It will be seen that the two tubes $T^1$, $T^2$ are subject to different stretch patterns and consequently the composite tubing T has a plurality of superimposed orientation patterns which provide greater strength than tubing formed from a single extrusion die.

It also will be apparent that while pin holes may occasionally occur in one or the other of the tubes $T^1$, $T^2$ as a result of lumpiness or non-uniformity of the extruded plastic, the possibility of pin holes in each tube being superimposed in the composite tubing T is remote as to be non-existent for all practical purposes.

While the illustrative embodiment of the drawings involves the extrusion of two tubes, additional generally concentric orifices similar to 25 and 32 may be provided for forming a composite tube T of a greater number of individual tubes.

The present invention also contemplates the continuous formation of a bonded multi-layer flat film or sheet rather than tubing from the tubes $T^1$, $T^2$, while the extruded plastic is drawn away from the die D under tension, as by the pulling rolls P. When sheet is being formed subatmospheric pressure preferably is maintained in the line B and within the tubing $T^2$ as well as in the line 40 and between $T^1$ and $T^2$ so that atmospheric pressure acts to firmly bond the several extruded and plastic layers into a pinhole-free composite sheet. It will be apparent that the composite sheet may be formed from a single tube rather than from a plurality of concentric tubes.

Other adaptations and embodiments of the invention will be apparent to those skilled in the art and it, therefore, is to be understood that the described embodiments are merely illustrative and that the scope of the invention is defined by the following claims.

I claim:

1. The process of forming tubing of thermoplastic material which includes continuously extruding the material in a heated and plastic condition through a plurality of annular die orifices to form a plurality of separate and independent hot plastic tubes one within another, pressing and bonding successive adjacent portions of the hot plastic tubes together into a single composite tube and cooling and setting said bonded tubing.

2. The process of forming tubing of thermoplastic material which includes continuously extruding the material in a heated and plastic condition through a plurality of concentric annular die orifices to form a plurality of separate and independent hot plastic tubes, expanding and pressing successive adjacent portions of one of the heated and plastic tubes into bonding engagement with another of the heated plastic tubes and cooling and setting the bonded tubing.

3. The process recited in claim 2 and wherein subatmospheric pressure is exerted on the surfaces of the tubing to be bonded together along the line of engagement.

4. The process recited in claim 2 and wherein said tube expansion is effected by superatmospheric fluid pressure within the expanded tube.

5. The process recited in claim 4 and wherein the bonded tubing is further expanded after bonding and before setting.

6. The process recited in claim 5 and wherein bonded tubing is pressed against a sizing member and more securely bonded by said superatmospheric pressure.

7. The process of forming tubing of thermoplastic material which includes continuously extruding the material in a heated and plastic condition through a plurality of annular die orifices to form a plurality of separate and independent concentric hot plastic tubes, expanding and pressing successive portions of an inner hot plastic tube into bonding engagement with adjacent portions of an outer hot plastic tube, thereafter expanding said bonded portions concurrently, and cooling and setting said bonded tubing.

8. The process of forming tubing of thermoplastic material which includes continuously extruding the material in a plastic condition through a plurality of annular generally concentric die orifices to form a plurality of separate and independent plastic tubes, and expanding and pressing successive adjacent portions of the tubes into overall surface engagement with each other.

9. The process recited in claim 8 and wherein one of said tubes is cooled below its minimum bonding temperature before another of said tubes is expanded and pressed into engagement therewith.

10. The process of forming multilayer film of thermoplastic material which includes continuously extruding the material as film in a heated plastic condition from a die, engaging and bonding successive portions of layers of the heated and plastic film into a single composite film of the several layers while maintaining a subatmospheric pressure between said layers along the line of engagement, and cooling and setting said bonded layers of film.

11. Apparatus for forming tubing of thermoplastic material which includes an extruder, a die having a plurality of annular and generally concentrically disposed die orifices through which to extrude the plastic material as a plurality of generally concentric separate and independent heated plastic tubes, and means for expanding and pressing the hot plastic tubes into bonding engagement with one another.

12. Apparatus as recited in claim 11 and including means for cooling and setting the bonded tubing.

13. Apparatus as recited in claim 11 and including a passageway through said die terminating between said orifices through which to withdraw air and establish a subatmospheric pressure between said tubes.

14. Apparatus as recited in claim 11 and wherein said die has a generally conical surface in which said orifices are located and from which said tubes are discharged.

15. Apparatus as recited in claim 11 and wherein said orifices are radially and longitudinally spaced relative to their axis of concentricity.

16. Apparatus as recited in claim 11 and wherein said die includes passageways for distributing plastic from said extruder to said orifices.

17. Apparatus for forming tubing of thermoplastic material which includes an extruder, a die having a plurality of annular and generally concentrically disposed die orifices through which to extrude the plastic material as a plurality of generally concentric separate and independent heated plastic tubes, and means for expanding and pressing the plastic tubes into engagement with one another.

(References on following page)

References Cited in the file of this patent

UNITED STATES PATENTS

| | | |
|---|---|---|
| 1,637,207 | Whitehouse | July 26, 1927 |
| 1,994,164 | Bailey | Mar. 12, 1935 |
| 2,501,690 | Prendergast | Mar. 28, 1950 |
| 2,513,106 | Prendergast | June 27, 1950 |
| 2,529,897 | Bailey et al. | Nov. 14, 1950 |
| 2,550,555 | Hallam et al. | Apr. 24, 1951 |
| 2,592,658 | Colombo | Apr. 15, 1952 |
| 2,632,205 | FitzHarris | Mar. 24, 1953 |